(12) United States Patent
Kho et al.

(10) Patent No.: US 11,275,921 B2
(45) Date of Patent: Mar. 15, 2022

(54) PIEZOELECTRIC PANEL SPEAKER AND ELECTRONIC APPARATUS INCLUDING THE SAME

(71) Applicant: LG Display Co., Ltd., Seoul (KR)

(72) Inventors: YuSeon Kho, Seoul (KR); Chiwan Kim, Goyang-si (KR); Taeheon Kim, Seoul (KR); Sung-Eui Shin, Seoul (KR); YongWoo Lee, Goyang-si (KR); Kyungyeol Ryu, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/940,955

(22) Filed: Jul. 28, 2020

(65) Prior Publication Data
US 2020/0356746 A1 Nov. 12, 2020

Related U.S. Application Data

(63) Continuation of application No. 16/108,849, filed on Aug. 22, 2018, now Pat. No. 10,762,320.

(30) Foreign Application Priority Data

Oct. 20, 2017 (KR) ........................ 10-2017-0136629

(51) Int. Cl.
| | | |
|---|---|---|
| G06K 9/20 | (2006.01) | |
| G06K 9/00 | (2022.01) | |
| H04R 7/04 | (2006.01) | |
| H04R 17/00 | (2006.01) | |

(52) U.S. Cl.
CPC ........... *G06K 9/0002* (2013.01); *H04R 7/045* (2013.01); *H04R 17/00* (2013.01)

(58) Field of Classification Search
CPC ............ H04R 2499/15; H04R 2499/11; H04R 17/00; H04R 17/005; H04R 7/045; G06K 9/0002; G06K 9/00006–9/0012
See application file for complete search history.

(56) References Cited

U.S. PATENT DOCUMENTS

| | | | |
|---|---|---|---|
| 8,666,126 | B2 | 3/2014 | Lee et al. |
| 9,607,203 | B1 * | 3/2017 | Yazdandoost ........ G06K 9/0002 |
| 10,860,146 | B2 | 12/2020 | Kim et al. |
| 2007/0046642 | A1 | 3/2007 | Lee et al. |
| 2012/0230524 | A1 | 9/2012 | Chang et al. |

(Continued)

FOREIGN PATENT DOCUMENTS

| | | |
|---|---|---|
| KR | 101255552 B1 | 4/2013 |
| KR | 20130060875 A | 6/2013 |

(Continued)

OTHER PUBLICATIONS

Office Action dated Jul. 19, 2021 issued by the Korean Intellectual Property Office in a corresponding Korean Patent Application No. 10-2017-0136629.

*Primary Examiner* — Brian Werner
(74) *Attorney, Agent, or Firm* — Morgan, Lewis & Bockius LLP (57) ABSTRACT

A piezoelectric panel speaker and an electronic apparatus including the same are disclosed. The piezoelectric panel speaker may include a piezoelectric panel including at least one hole and configured to vibrate, and a fingerprint sensor accommodated into the one hole and configured to sense biometric information.

24 Claims, 6 Drawing Sheets

(56) References Cited

U.S. PATENT DOCUMENTS

| | | |
|---|---|---|
| 2013/0136321 A1 | 5/2013 | Lee et al. |
| 2015/0165479 A1 | 6/2015 | Lasiter et al. |
| 2015/0169136 A1 | 6/2015 | Ganti et al. |
| 2017/0193263 A1 | 7/2017 | Zhu |
| 2018/0267673 A1* | 9/2018 | Kim ................... G06F 3/0433 |
| 2018/0276440 A1* | 9/2018 | Strohmann ......... G06K 9/0008 |

FOREIGN PATENT DOCUMENTS

| | | |
|---|---|---|
| KR | 20160096648 A | 8/2016 |
| KR | 20180105927 A | 10/2018 |

* cited by examiner

PIEZOELECTRIC PANEL SPEAKER AND ELECTRONIC APPARATUS INCLUDING THE SAME

CROSS-REFERENCE TO RELATED APPLICATIONS

This application is a continuation of U.S. patent application Ser. No. 16/108,849, filed on Aug. 22, 2018, which claims the benefit of and priority to Korean Patent Application No. 10-2017-0136629, filed on Oct. 20, 2017. All of the above prior U.S. and Korean Patent Applications are hereby incorporated by reference in their entirety as if fully set forth herein.

BACKGROUND

1. Technical Field

The present disclosure relates to a piezoelectric panel speaker and an electronic apparatus including the same.

2. Discussion of the Related Art

In general, electronic apparatuses, such as televisions (TVs), monitors, notebook computers, smartphones, tablet computers, electronic pads, wearable devices, watch phones, portable information devices, navigation devices, and vehicle control display devices, include a display device for displaying an image and a sound device for outputting a sound associated with the image. Also, electronic apparatuses have recently been incorporation a fingerprint identification function using a capacitive or optical fingerprint sensor for reinforcing security and for convenience of use.

However, in electronic apparatuses, the sound output from the sound device typically travels in a direction toward a rear surface or a lower surface (or a side surface) of the display device. In this arrangement, sound quality may deteriorate, for example, due to an interference between sounds reflecting on the walls and floor. For this reason, it is difficult to deliver an accurate sound to a viewer without hindering his or her immersion experience. Also, in electronic apparatuses, capacitive or optical fingerprint sensors are low in waterproofing property, are sensitive to a state change of a fingerprint region caused by sweat and/or moisture, and may be relatively easy to forge due to a low resolution.

SUMMARY

Accordingly, the present disclosure is directed to a piezoelectric panel speaker and an electronic apparatus including the same that substantially obviate one or more of the issues due to limitations and disadvantages of the related art.

An aspect of the present disclosure is to provide a piezoelectric panel speaker and an electronic apparatus including the same, which vibrate a display panel to output a sound and identify biometric information.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof, as well as the appended drawings.

To achieve these and other aspects of the inventive concepts as embodied and broadly described, a piezoelectric panel speaker may include: a piezoelectric panel including at least one hole and configured to vibrate; and a fingerprint sensor accommodated into the one hole and configured to sense biometric information.

The piezoelectric panel may include: a piezoelectric film including the at least one hole; a first electrode on a first surface of the piezoelectric film, except in a portion where the at least one hole is located; and a second electrode on a second surface of the piezoelectric film opposite the first surface, except in a portion where the at least one hole is located, the piezoelectric film being between the first electrode and the second electrode.

The piezoelectric film may include one or more of a polymer material-containing piezoelectric material, a thin film material-containing piezoelectric material, and a composite material-containing piezoelectric material.

The polymer material-containing piezoelectric material include poly vinylidene fluoride (PVDF), polyvinylidene fluoride trifluoroethylene P(VDF-TrFe), or P(VDFTeFE). The thin film material-containing piezoelectric material may include ZnO, CdS, or AlN. The composite material-containing piezoelectric material may include PZT-PVDF, PZT-silicon rubber, PZT-epoxy, PZT-foam polymer, or PZT-foam urethane.

In the above piezoelectric panel speaker, the fingerprint sensor may include a plurality of piezoelectric elements.

Each of the piezoelectric elements may include a single crystalline ceramic piezoelectric material or a polycrystalline ceramic piezoelectric material.

The single crystalline ceramic piezoelectric material may include $\alpha\text{-AlPO}_4$, $\alpha\text{-SiO}_2$, $\text{LiNbO}_3$, $\text{Tb}_2(\text{MoO}_4)_3$, $\text{Li}_2\text{B}_4\text{O}_7$, or ZnO. The polycrystalline ceramic piezoelectric material may include a PZT-based ceramic piezoelectric material, a PT-based ceramic piezoelectric material, a PZT-complex perovskite-based ceramic piezoelectric material, or $\text{BaTiO}_3$.

The fingerprint sensor may further include: a first sensor electrode electrically connected to one end of each of the piezoelectric elements; and a plurality of second sensor electrodes each electrically connected to another end of a corresponding one of the piezoelectric elements.

In the above piezoelectric panel speaker, the at least one hole may occupy 5% to 20% of a total area of a surface of the piezoelectric panel.

The piezoelectric panel speaker may include a plurality of fingerprint sensors including the above fingerprint sensor. The piezoelectric panel may include a plurality of holes including the above at least one hole, each of the holes accommodating a corresponding one of the fingerprint sensors.

An area of each of the holes may be 1 cm$^2$ to 4 cm$^2$, and a distance between two adjacent holes among the holes may be 3 cm or more.

The piezoelectric panel may further include a protrusion protruding from the first surface of the piezoelectric film to surround the one hole.

The protrusion may have: a curved cross-sectional structure; a multi-step structure having a smaller width farther away from the first surface of the piezoelectric film than closer to the first surface; or an L-shaped cross-sectional structure having a vertical portion extending out of the first surface of the piezoelectric film, and a horizontal portion bent from the vertical portion and substantially parallel to the first surface of the piezoelectric film.

The fingerprint sensor may be configured to transmit an ultrasound signal or receive an ultrasound signal, or both.

In another aspect, an electronic apparatus may include the above piezoelectric panel speaker and may further include: a display panel on the piezoelectric panel speaker and configured to be vibrated based on a vibration of the piezoelectric panel to generate sound.

In yet another aspect, an electronic apparatus may include: a display module configured to display an image; and a piezoelectric panel speaker module behind the display module, wherein the piezoelectric panel speaker module is configured to vibrate the display module to output sound, and to transmit or receive a biometric recognition signal.

The piezoelectric panel speaker module may include: a piezoelectric panel including at least one hole; and a fingerprint sensor accommodated into the one hole and configured to sense biometric information.

The fingerprint sensor may include a plurality of piezoelectric elements transmitting or receiving the biometric recognition signal.

The fingerprint sensor may further include: a first sensor electrode connected to a first surface of each of the plurality of piezoelectric elements; and a plurality of second sensor electrodes each connected to a second surface of a corresponding one of the plurality of piezoelectric elements.

The display module may include an organic light emitting display panel, and the piezoelectric panel speaker module may be attached to a rear surface of the organic light emitting display panel.

In the above electronic apparatus, the biometric recognition signal may be an ultrasound signal.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with example embodiments of the disclosure.

It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included, for example, to provide a further understanding of the disclosure and are incorporated in and constitute a part of this specification, illustrate embodiments of the disclosure and together with the description serve to explain various principles of the disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, a detailed description of functions or configurations related to this document that are well-known to those skilled in the art may be omitted. The progression of processing steps and/or operations described is an example. The sequence of steps and/or operations is not limited to that set forth herein and may be changed as is known in the art or apparent to those skilled in the art, with the exception of steps and/or operations necessarily occurring in a particular order. Names of the respective elements used in the following explanations are selected only for convenience of writing the specification and may thus be different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Unless otherwise described, like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms like "first," "second," etc., may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" encompasses the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

Hereinafter, embodiments of a piezoelectric panel speaker and an electronic apparatus including the same according to example embodiments of the present disclosure will be described in detail with reference to the accompanying drawings. In adding reference numerals to elements of each of the drawings, although the same elements are illustrated in other drawings, like reference numerals may refer to like elements.

Figure 1:
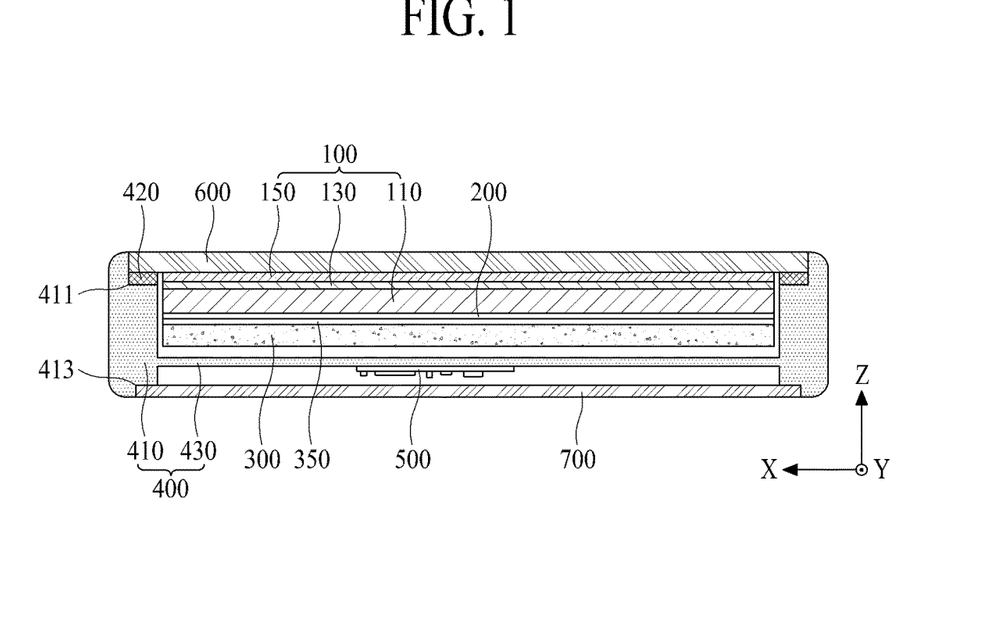
FIG. 1 is a cross-sectional view schematically illustrating an electronic apparatus according to an example embodiment of the present disclosure.

FIG. 1 is a cross-sectional view schematically illustrating an electronic apparatus according to an example embodiment of the present disclosure.

With reference to FIG. 1, a piezoelectric panel speaker and an electronic apparatus including the same according to an example embodiment of the present disclosure may each include a display module 100 for displaying an image and a piezoelectric panel speaker module 300 disposed behind the rear portion of the display module 100 (or below a lower surface of the display panel in the example orientation shown in FIG. 1).

The display module 100 may include a display panel 110 and a touch panel 130.

The display panel 110 may be a light emitting display panel or a flexible light emitting display panel, but is not limited thereto. The display panel 110 according to an example embodiment may include a pixel array substrate, including a pixel array including a plurality of pixels, and an encapsulation layer which encapsulates the pixel array.

The plurality of pixels may be respectively provided in a plurality of pixel areas defined by a plurality of pixel driving lines. Each of the plurality of pixels may include a pixel circuit, including at least two thin film transistors (TFTs) and at least one capacitor, and a light emitting device which emits light with a current supplied from the pixel circuit. For example, the light emitting device may include an organic light emitting layer or a quantum dot light emitting layer. As another example, the light emitting device may include a micro light emitting diode (LED).

The encapsulation layer may protect the TFTs and the light emitting device from an external impact and may reduce or prevent moisture from penetrating into the light emitting device. The encapsulation layer may be replaced by an encapsulation substrate which is attached to a pixel array substrate by a filler surrounding the pixel array. If the filler is a transparent filler, the encapsulation substrate may be a transparent encapsulation substrate.

The touch panel 130 may include a touch electrode layer which is provided on the display panel 110, and may include a touch electrode for sensing a user touch applied to the display module 100. The touch electrode layer may sense a capacitance variation of the touch electrode caused by a user touch. For example, the touch electrode layer may include a touch electrode for sensing the user touch in a mutual capacitive type or a self-capacitive type.

Moreover, the display module 100 may further include a polarization film 150 on the touch panel 130. The polarization film 150 may be attached to an upper surface of the touch panel 130 by a film adhesive member. The polarization film 150 may circularly polarize external light reflected by the TFT and/or the pixel driving lines on the pixel array substrate, thereby enhancing the visibility and contrast ratio of the display panel 110. The polarization film 150 may be disposed between the encapsulation layer of the display panel 110 and the touch panel 130.

Moreover, the display module 100 may further include a barrier layer between the encapsulation layer of the display panel 110 and the touch panel 130. The barrier layer may reduce or prevent moisture and/or the like from penetrating through the pixel array.

Moreover, the display module 100 may further include a color filter layer on an upper portion of the encapsulation layer of the display panel 110. The color filter layer may include a color filter which is provided to overlap a corresponding pixel of the plurality of pixels and to transmit only a wavelength of a color set in the corresponding pixel.

The piezoelectric panel speaker module 300 (or the piezoelectric panel speaker) may be disposed on a rear surface of the display module 100 and on a rear surface of the display panel 110. For example, the piezoelectric panel speaker module 300 may be attached to the rear surface of the display panel 110 by an adhesive member 200, for directly vibrating the display panel 110. For example, the piezoelectric panel speaker module 300 may be attached to the entire rear surface of the display panel 110, but embodiments are not limited thereto. The piezoelectric panel speaker module 300 may be deformed according to a vibration driving signal (or a voice signal) to directly vibrate the display panel 110. Thus, the piezoelectric panel speaker module 300 may allow a sound generated based on the vibration of the display panel 110 to be output in a direction Z toward a front portion of the display panel 110. The piezoelectric panel speaker module 300 may transmit a biometric recognition signal in response to a biometric recognition driving signal and may receive the biometric recognition signal reflected by a human body to sense biometric information. The biometric recognition signal may be an ultrasound signal for sensing a fingerprint, blood vessel, or bone form of a user. In the description below, an example embodiment where the biometric recognition signal is an ultrasound signal will be discussed, but embodiments are not limited thereto.

The adhesive member 200 may include a natural curable adhesive, a thermocurable adhesive, or a photocurable adhesive. For example, the adhesive member 200 may be formed of the natural curable adhesive for suppressing or preventing a characteristic of the piezoelectric panel speaker module 300 from being degraded by heat during a curing process.

The electronic apparatus according to an example embodiment of the present disclosure may further include a housing 400, a driving circuit unit 500, a cover window 600, and a rear cover 700.

The housing 400 may accommodate the display module 100. The housing 400 may include a housing sidewall 410 and a housing plate 430.

The housing sidewall 410 may be provided in a frame shape to have a display accommodation space into which the display module 100 may be accommodated, and may surround each of side surfaces of the display module 100. The housing sidewall 410 may support the cover window 600 and the rear cover 700. The housing sidewall 410 may include an upper stepped portion 411, which is concavely provided from an upper inner surface to support the cover window 600, and a lower stepped portion 413 which is concavely provided from a lower inner surface to support the rear cover 700.

The housing plate 430 may be connected to an inner surface of the housing sidewall 410 to cover the rear surface of the display module 100. The display accommodation space surrounded by the housing sidewall 410 may be provided on a front surface of the housing plate 430, and a circuit accommodation space for accommodating electronic circuits, such as the driving circuit unit 500 and peripheral circuits of the electronic apparatus including a battery and the like, may be provided on a rear surface of the housing plate 430. To this end, the housing plate 430 may be spaced apart from the rear surface of the display module 100, and moreover, may be spaced apart from the rear cover 700.

The driving circuit unit 500 may generate an image signal and may supply the image signal to each of the plurality of pixels to allow the display panel 110 to display an image. The driving circuit unit 500 may generate an audio signal, such as a voice signal, based on an audio source and may amplify the audio signal to generate the vibration driving signal, thereby deforming (or vibrating) the piezoelectric panel speaker module 300. The driving circuit unit 500 may calculate a touch position of a user touch through the touch panel 130 and may execute an application corresponding to the calculated touch position. The driving circuit unit 500 may generate a biometric recognition driving signal based on execution of a fingerprint identification application to transmit an ultrasound signal through the piezoelectric panel speaker module 300, to receive an ultrasound signal input through the piezoelectric panel speaker module 300 to recognize biometric information, and to determine whether the recognized biometric information matches preregistered biometric information, thereby authenticating the biometric information.

Moreover, the driving circuit unit 500 may be mounted on the display panel 110 or on the housing plate 430.

The cover window 600 may be connected to the housing 400 to support or cover the display module 100. For example, the cover window 600 may support or cover the display module 100, and may be supported by the upper stepped portion 411 provided in the housing sidewall 410 of the housing 400. The cover window 600 may be formed of glass or tempered glass, but is not limited thereto. For example, the cover window 600 may include one of sapphire glass and gorilla glass, or a junction structure thereof. The cover window 600 may be attached to a front surface of the display module 100 by an optically adhesive member. The optically adhesive member may be an optically clear adhesive (OCA) or a pressure sensitive adhesive (PSA), but is not limited thereto.

The cover window 600 may cover a non-display area except for a display area of the display module 100. The cover window 600 may include a transparent area overlapping the display area of the display module 100, a light blocking area overlapping the non-display area of the display module 100, and a design layer which is provided in the light blocking area to cover the non-display area of the display module 100.

A buffering member 420 may be disposed between the cover window 600 and the upper stepped portion 411 of the housing 400. The buffering member 420 may include, without limitation, a double-sided tape or a foam pad. The buffering member 420 may reduce an impact applied to the cover window 600 and may suppress or prevent a vibration of the display module 100 from being transferred to the housing 400.

The rear cover 700 may be connected to the housing 400 to cover a rear surface of the housing 400. For example, the rear cover 700 may cover the circuit accommodation space in the rear surface of the housing 400. To this end, the rear cover 700 may be connected to or accommodated in the lower stepped portion 413 provided in the housing sidewall 410 of the housing 400. The rear cover 700 according to an example embodiment may be formed of the same material as that of the cover window 600, or may be formed of glass or tempered glass which differs from a material of the cover window 600, but embodiments are not limited thereto. For example, the rear cover 700 may include, without limitation, one of sapphire glass and gorilla glass, or a junction structure thereof.

As described above, the piezoelectric panel speaker and the electronic apparatus including the same according to an example embodiment of the present disclosure may vibrate the display module 100 (i.e., the display panel 110) by using the piezoelectric panel speaker module 300 to output a sound, generated based on the vibration of the display panel 110, to a region in front of the display module 100. Thus, the piezoelectric panel speaker and the electronic apparatus including the same according to an example embodiment of the present disclosure may output an accurate sound, thereby enhancing a viewer's immersion experience. Also, even without a separate bio-information recognition device, biometric information may be recognized by transmitting or receiving an ultrasound signal through the piezoelectric panel speaker module 300. By recognizing ultrasound biometric information, security may be reinforced.

Figure 2:
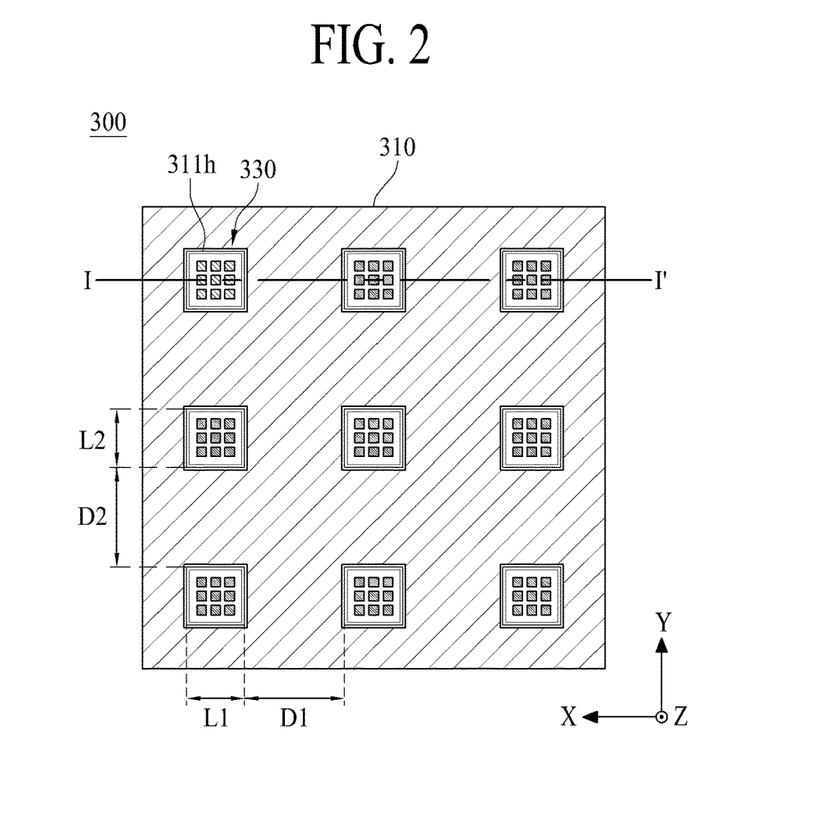
FIG. 2 is a plan view of a piezoelectric panel speaker module according to an example embodiment of the present disclosure.
Figure 3:
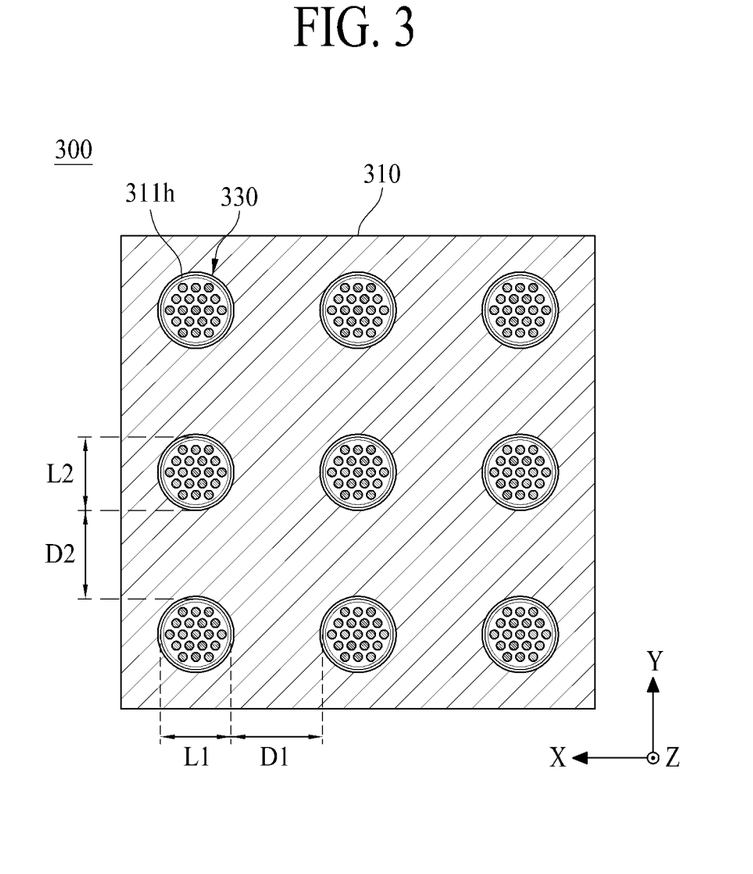
FIG. 3 is a plan view of a piezoelectric panel speaker module according to another example embodiment of the present disclosure.
Figure 4:
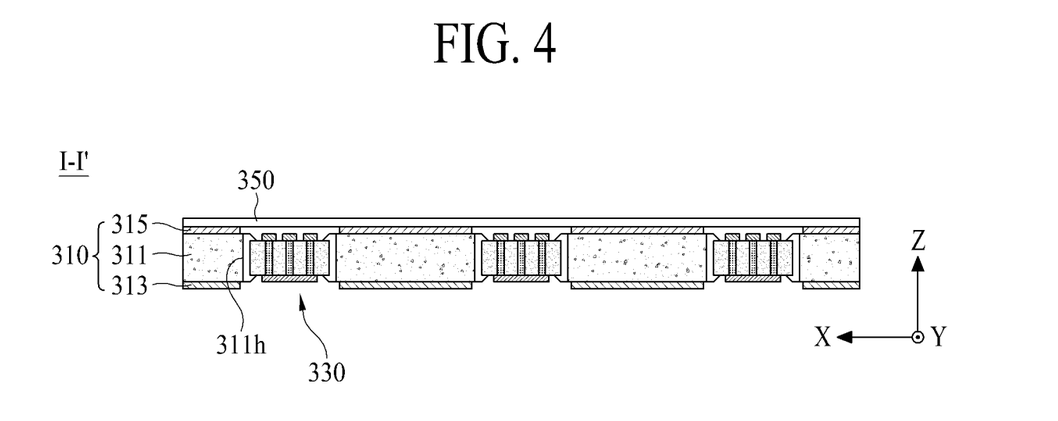
FIG. 4 is a cross-sectional view taken along line I-I' of FIG. 2.
Figure 5:
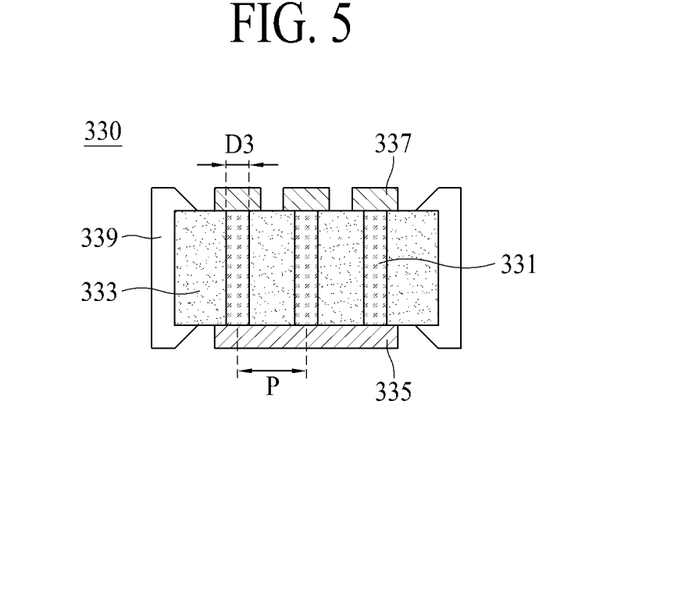
FIG. 5 is a cross-sectional view illustrating one fingerprint sensor illustrated in FIG. 4.

FIG. 2 is a plan view of a piezoelectric panel speaker module according to an example embodiment of the present disclosure. FIG. 3 is a plan view of a piezoelectric panel speaker module according to another example embodiment of the present disclosure. FIG. 4 is a cross-sectional view taken along line I-I' of FIG. 2. FIG. 5 is a cross-sectional view illustrating one example fingerprint sensor illustrated in FIG. 4.

With reference to FIGS. 2 to 5, a piezoelectric panel speaker module 300 according to an example embodiment of the present disclosure may include a piezoelectric panel 310, including a plurality of holes 311h, and a plurality of fingerprint sensors 330 respectively inserted into the plurality of holes 311h provided in the piezoelectric panel 310.

The piezoelectric panel 310 may be deformed (or vibrate) according to an audio signal to vibrate a display panel. The piezoelectric panel 310 according to an example embodiment may include a piezoelectric film 311, a first electrode 313, and a second electrode 315.

The piezoelectric film 311 may have a certain or predetermined thickness and the same shape as that of the display panel, and may include the plurality of holes 311h.

The piezoelectric film 311 may include a piezoelectric material which is deformed (or vibrates) according to an inverse piezoelectric effect based on a vibration driving signal.

The piezoelectric film 311 may include a polymer material-containing piezoelectric material, a thin film material-containing piezoelectric material, or a composite material-containing piezoelectric material, but embodiments are not limited thereto. For example, all materials having a piezoelectric effect may be applied to the piezoelectric film 311.

Examples of the polymer material-containing piezoelectric material may include, without limitation, poly vinylidene fluoride (PVDF), polyvinylidene fluoride trifluoroethylene P(VDF-TrFe), and P(VDFTeFE). Examples of the thin film material-containing piezoelectric material may include, without limitation, ZnO, CdS, and AlN. Examples of the composite material-containing piezoelectric material may include, without limitation, PZT-PVDF, PZT-silicon rubber, PZT-epoxy, PZT-foam polymer, and PZT-foam urethane. Here, PVDF may be a semi-crystalline ferroelectric polymer and may have a high elastic coefficient and good flexibility. Moreover, PVDF may have a characteristic which may be easier to manufacture into a film, is light and flexible, and is robust to an impact without being broken. The piezoelectric film 311 according to an example embodiment of the present embodiment may include, without limitation, PVDF.

Each of the plurality of holes 311h may have a particular or predetermined size, and the plurality of holes 311h may be arranged at certain or predetermined intervals to vertically pass through the piezoelectric film 311.

Each of the plurality of holes 311 may have a circular shape as illustrated in FIG. 3, or may have a square shape as illustrated in FIG. 4. However, embodiments are not limited thereto. For example, each of the plurality of holes 311 may have a polygonal shape such as a triangular, pentagonal, hexagonal, or octagonal shape, or may have a rectangular shape, having a short side which is round, or an elliptical or oval shape similar to a shape of a user finger.

Each of the plurality of holes 311h according to an example embodiment may have a size which enables sensing of biometric information about a user (e.g., a fingerprint of a user finger). For example, each of the plurality of holes 311h may have a size of 1 cm$^2$ to 4 cm$^2$. That is, a first length L1 of each of a plurality of holes 311h in a first direction X may be 1 cm to 2 cm, and a second length L2 of each of a plurality of holes 311h in a second direction Y may be 1 cm to 2 cm. The first direction X may be a widthwise direction of the piezoelectric film 311, and the second direction Y may be a lengthwise direction of the piezoelectric film 311.

Intervals D1 and D2 between the plurality of holes 311h according to an example embodiment may be equal to or greater than a width of the user finger corresponding to biometric information about the user. For example, a first interval D1 between the plurality of holes 311h in the first direction X may be 3 cm or more, and a second interval D2 between the plurality of holes 311h in the second direction Y may be 3 cm or more. Here, maximum intervals D1 and D2 between the plurality of holes 311h may be adjusted based on a resolution of the biometric information.

The first electrode 313 may be disposed in a portion of a first surface of the piezoelectric film 311, except where the plurality of holes 311h are located. The first electrode 313 according to an example embodiment may be provided as one body on the first surface of the piezoelectric film 311.

The second electrode 315 may be disposed in a portion of a second surface opposite to the first surface of the piezoelectric film 311, except where the plurality of holes 311h are located. The second electrode 315 according to an example embodiment may be provided as one body on the second surface of the piezoelectric film 311. The second electrode 315 may overlap the first electrode 313 with the piezoelectric film 311 therebetween.

The first electrode 313 and the second electrode 315 according to an example embodiment may each include a conductive material. For example, the first electrode 313 and the second electrode 315 may each include, without limitation, a transparent conductive metal oxide, such as indium tin oxide, indium zinc oxide, copper oxide, tin oxide, zinc oxide, and titanium oxide. As another example, the first electrode 313 and the second electrode 315 may each include, without limitation, a nano wire, a photosensitive nano wire film, carbon nano tube (CNT), graphene, or a conductive polymer. As another example, the first electrode 313 and the second electrode 315 may each include, without limitation, a single-layer or multi-layer structure including at least one of the following metals: chromium (Cr), nickel (Ni), copper (Cu), aluminum (Al), silver (Ag), molybdenum (Mo), gold (Au), magnesium (Mg), titanium (Ti), and an alloy thereof.

The piezoelectric panel 310 according to an example embodiment of the present disclosure may be deformed or may vibrate based on an electric field which is generated between the first electrode 313 and the second electrode 315 according to the vibration driving signal applied to one or both of the first electrode 313 and the second electrode 315. Thus, the piezoelectric panel 310 may vibrate the display panel, thereby generating sound to be output from the display panel.

The plurality of fingerprint sensors 330 may be respectively accommodated into the plurality of holes 311h in the piezoelectric panel 310, and may transmit or receive an ultrasound signal according to the biometric recognition driving signal to sense biometric information. Each of the plurality of fingerprint sensors 330 according to an example embodiment of the present disclosure may include a plurality of piezoelectric elements 331, a filler 333, a first sensor electrode 335, and a plurality of second sensor electrodes 337.

Each of the plurality of piezoelectric elements 331 may be deformed (or vibrate) according to the inverse piezoelectric effect based on the biometric recognition driving signal to transmit an ultrasound signal, and may be deformed (or vibrate) according to a piezoelectric effect based on the ultrasound signal to generate an ultrasound received signal. For example, as pressure is applied to or twisting occurs in a crystalline structure due to an ultrasound signal reflected by a human body, each of the plurality of piezoelectric elements 331 may generate the ultrasound received signal corresponding to a potential difference caused by dielectric polarization based on a relative position change of a positive (+) ion and a negative (−) ion, or may vibrate according to an electric field based on the biometric recognition driving signal to generate an ultrasound signal.

Each of the plurality of piezoelectric elements 331 may have a circular pillar shape or a polygonal pillar shape having a certain or predetermined height and size. For example, the plurality of piezoelectric elements 331 having a pillar shape may be arranged as a matrix type having a plurality of columns and rows. As another example, the plurality of piezoelectric elements 331 having a pillar shape may be arranged as a matrix type, or may be arranged as a zigzag type along a column direction or a row direction.

The plurality of piezoelectric elements 331 according to an example embodiment may each include a ceramic piezoelectric material. According to another example embodiment, the plurality of piezoelectric elements 331 may each include the same piezoelectric material as that of the piezoelectric film 311 of the piezoelectric panel 310. Examples of the ceramic piezoelectric material may include, without limitation, a single crystalline ceramic piezoelectric material and a polycrystalline ceramic piezoelectric material. Examples of the single crystalline ceramic piezoelectric material may include, without limitation, $\alpha$-$AlPO_4$, $\alpha$-$SiO_2$, $LiNbO_3$, $Tb_2(MoO_4)_3$, $Li_2B_4O_7$, and $ZnO$. Examples of the polycrystalline ceramic piezoelectric material may include, without limitation, a PZT-based ceramic piezoelectric material, a PT-based ceramic piezoelectric material, a PZT-complex perovskite-based ceramic piezoelectric material, and $BaTiO_3$. For example, the plurality of fingerprint sensors 330 including the piezoelectric material may each include a PZT-based ceramic piezoelectric material having a broad frequency response characteristic.

A size or width D3 of each of the plurality of piezoelectric elements 331 according to an example embodiment may be 50 μm or less, but embodiments are not limited thereto. In other embodiments, the size D3 may be less than a crest (i.e., an interval between a ridge pattern and another ridge pattern) of a fingerprint of a user, or may be set based on a resolution of biometric information. For example, if a distance between adjacent ridge patterns of a fingerprint is a reference distance, each of the plurality of piezoelectric elements 331 may have a size which enables two or more piezoelectric elements 331 to be disposed within the reference distance.

A pitch P between the plurality of piezoelectric elements 331 according to an example embodiment may be 150 μm or less, but embodiments are not limited thereto. In other embodiments, the pitch P may be adjusted based on the resolution of the biometric information.

The filler 333 may have the same shape as that of each of the holes 311h in the piezoelectric film 311 and may have a size which enables the filler 333 to be accommodated into a corresponding hole 311h. The filler 333 may surround each of the plurality of piezoelectric elements 331. For example, the plurality of piezoelectric elements 331 may be accommodated into the filler 333 to have a particular interval. The filler 333 according to an example embodiment may include a polymer material. The filler 333 may reduce or prevent interference between adjacent piezoelectric elements 331 when each of the plurality of piezoelectric elements 331 vibrates to generate an ultrasound signal.

The first sensor electrode 335 may be provided on a first surface of the filler 333 and may be electrically connected to one end of each of the plurality of piezoelectric elements 331. The first sensor electrode 335 according to an example embodiment may be provided as one body on the first surface of the filler 333. For example, the first sensor electrode 335 may be a fingerprint sensing common electrode which is connected to the one end of each of the plurality of piezoelectric elements 331 in common.

The plurality of second sensor electrodes 337 may be provided on a second surface opposite the first surface of the filler 333, and may be electrically connected to the other ends of the plurality of piezoelectric elements 331, respectively. Each of the second sensor electrodes 337 according to an embodiment may be patterned on the second surface of the filler 333 to individually overlap the other end of a corresponding one of the plurality of piezoelectric elements 331, and thus may be connected to the other end of the corresponding piezoelectric element 331 in a one-to-one relationship. Each of the plurality of second sensor electrodes 337 may be electrically connected to a driving circuit unit through a received routing line, and may provide an ultrasound received signal, generated by a corresponding one of the plurality of piezoelectric elements 331, to the driving circuit unit through the received routing line.

Alternatively, a plurality of first sensor electrodes 335 may be provided, with each being connected to the one end of a corresponding one of the plurality of piezoelectric elements 331 in a one-to-one relationship, and a single second sensor electrode 337 may be connected to the other end of each of the plurality of piezoelectric elements 331 in common.

Each of the plurality of fingerprint sensors 330 according to an example embodiment of the present disclosure may further include a case 339. The case 339 may surround a side surface, a periphery of the first surface, and a periphery of the second surface of the filler 333. The case 339 according to an example embodiment of the present disclosure may suppress or prevent the fingerprint sensor 330 from being deformed by an external impact.

The plurality of fingerprint sensors 330 according to an example embodiment of the present disclosure may be respectively accommodated into the plurality of holes 311h in the piezoelectric panel 310. Each of the plurality of fingerprint sensors 330 may be deformed (or vibrate) according to the inverse piezoelectric effect based on the biometric recognition driving signal to transmit an ultrasound signal, and may be deformed (or vibrate) according to the piezoelectric effect based on the ultrasound signal to generate an ultrasound received signal, thereby sensing biometric information.

The piezoelectric panel speaker module 300 according to an example embodiment of the present disclosure may further include an insulation member 350 which covers the piezoelectric panel 310 and the second surface of each of the plurality of fingerprint sensors 330.

The insulation member 350 may electrically insulate the second electrode 315 in the piezoelectric panel 310 and the plurality of second sensor electrodes 337 respectively in the plurality of fingerprint sensors 330 from one another. The insulation member 350 may be an insulation layer coated or formed on a front surface of the piezoelectric panel speaker module 300, or may be an insulation sheet between the display panel 110 and the piezoelectric panel speaker module 300. The insulation member 350 may include a material similar to a sound impedance value of a bio-tissue. The insulation member 350 according to an example embodiment of the present disclosure may include, without limitation, a polymer material, polyurethane, or polystyrene, etc.

Moreover, the piezoelectric panel speaker module 300 according to an example embodiment of the present disclosure may vibrate the display panel to output sound. As a surface area of the piezoelectric film 311 increases, a low-pitched sound band frequency characteristic of the piezoelectric panel speaker module 300 may be reinforced. However, a total surface area of the piezoelectric film 311 may be reduced by a surface area occupied by the plurality of holes 311h which are formed to embed, insert, or accommodate the plurality of fingerprint sensors 330 into the piezoelectric film 311. Such a reduction in the surface area may cause a decline in the low-pitched sound band frequency characteristic of the piezoelectric panel speaker module 300. Therefore, as a result of experiments performed on the low-pitched sound band frequency characteristic of the piezoelectric panel speaker module 300 with respect to a surface area occupied by the plurality of holes 311h, the inventors have confirmed that if a total surface area occupied by the plurality of holes 311h is 5% or less of a total surface area of the piezoelectric panel 311, the low-pitched sound band frequency characteristic of the piezoelectric panel speaker module 300 may not decline. However, if the total surface area occupied by the plurality of holes 311h is higher than 20% of the total surface area of the piezoelectric panel 311, the low-pitched sound band frequency characteristic of the piezoelectric panel speaker module 300 may significantly decline. Therefore, in order to minimize or suppress a decline in the low sound band frequency characteristic of the piezoelectric panel speaker module 300 caused by the plurality of holes 311h, the total surface area occupied by the plurality of holes 311h may be set to 5% to 20% of the total surface area of the piezoelectric panel 311.

As described above, in the piezoelectric panel speaker module 300 according to an example embodiment of the present disclosure, the display panel may vibrate through a vibration of the piezoelectric panel 310 to output a sound (SW). In addition, biometric information about a user may be sensed by transmitting or receiving an ultrasound signal through each of the plurality of fingerprint sensors 330. Also, in the piezoelectric panel speaker module 300 according to an example embodiment of the present disclosure, each of the plurality of fingerprint sensors 330 may be embedded into or provided as one body with the piezoelectric panel 310, thereby enabling slimming of electronic apparatuses and reducing the manufacturing cost.

Figure 6:
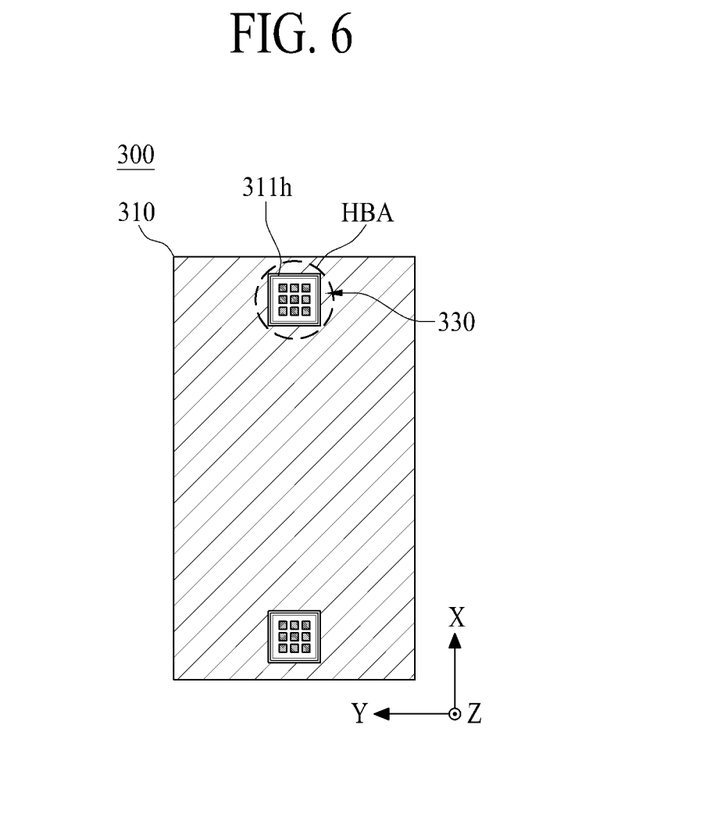
FIG. 6 is a plan view of a piezoelectric panel speaker module according to another example embodiment of the present disclosure.

FIG. 6 is a plan view of a piezoelectric panel speaker module 300 according to another example embodiment of the present disclosure and illustrates a piezoelectric panel speaker module applied to such electronic apparatuses as smartphones, tablet computers, electronic pads, wearable devices, watch phones, portable information devices, etc.

With reference to FIG. 6, the piezoelectric panel speaker module 300 according to another example embodiment of the present disclosure may include a piezoelectric panel 310 including two holes 311h and two fingerprint sensors 330 which are respectively inserted or accommodated into the two holes 311h provided in the piezoelectric panel 310.

The piezoelectric panel 310 may be deformed based on a voice or audio signal to vibrate a display panel and is substantially similar to the piezoelectric panel illustrated in FIGS. 2 to 4, except that the piezoelectric panel 310 includes the two holes 311h. Thus, overlapping descriptions of the same elements are omitted.

The two holes 311h may be provided near two opposing peripheral ends of a piezoelectric film in a first direction X. One or each of the two holes 311h may overlap a home button area HBA, which may be displayed on the display panel and may be software-enabled. For example, instead of providing a physical home button, an electronic apparatus according to an example embodiment of the present disclosure may display a software-enabled home button on the display panel and may execute an application associated with the home button according to a user touch applied to the software-enabled home button. For example, the software-enabled home button (or a software-enabled fingerprint identification area) may be displayed near one peripheral end or the other peripheral end of the display panel according to a rotation state of the electronic apparatus. Therefore, in order for the fingerprint sensors 330 to be embedded, the two holes 311h may be respectively provided at positions near each of the peripheral ends of the piezoelectric film overlapping the areas where the software-enabled home button may be displayed based on the rotation state of the electronic apparatus.

The two fingerprint sensors 330 may be respectively inserted into the two holes 311h, and may transmit or receive an ultrasound signal to sense biometric information. Except the two fingerprint sensors 330 sensing biometric information through a finger of a user contacting the software-enabled home button, the fingerprint sensors 330 of FIG. 6 are substantially similar to the fingerprint sensors illustrated in FIGS. 2 to 5. Thus, the above descriptions of the fingerprint sensors 330 are not repeated.

Moreover, if the software-enabled home button is displayed only at one peripheral end of the display panel regardless of the rotation state of the electronic apparatus, a fingerprint sensor and a hole 311h at the other peripheral end of the display panel may be omitted. For example, the piezoelectric panel speaker module 300 according to an example embodiment of the present disclosure may include a piezoelectric panel 310 including at least one hole 311h and at least one fingerprint sensor 330 accommodated into the at least one hole 311h.

Figure 7:
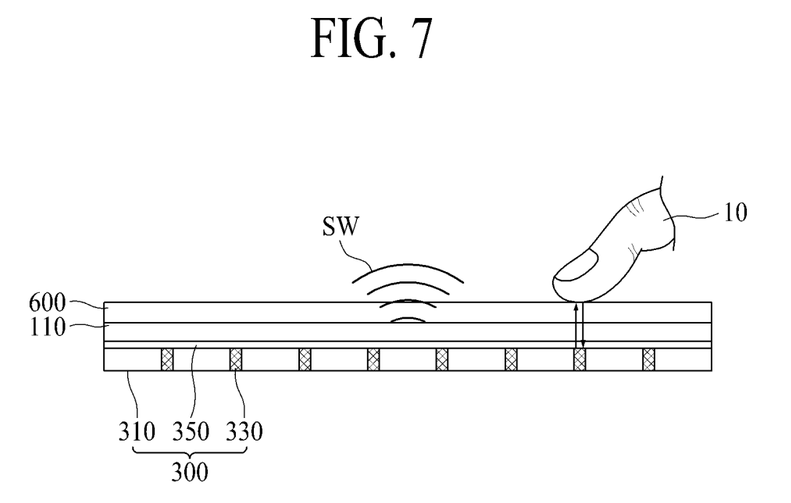
FIG. 7 is a diagram illustrating an output of a sound and sensing of biometric information in an electronic apparatus according to an example embodiment of the present disclosure.
Figure 8:
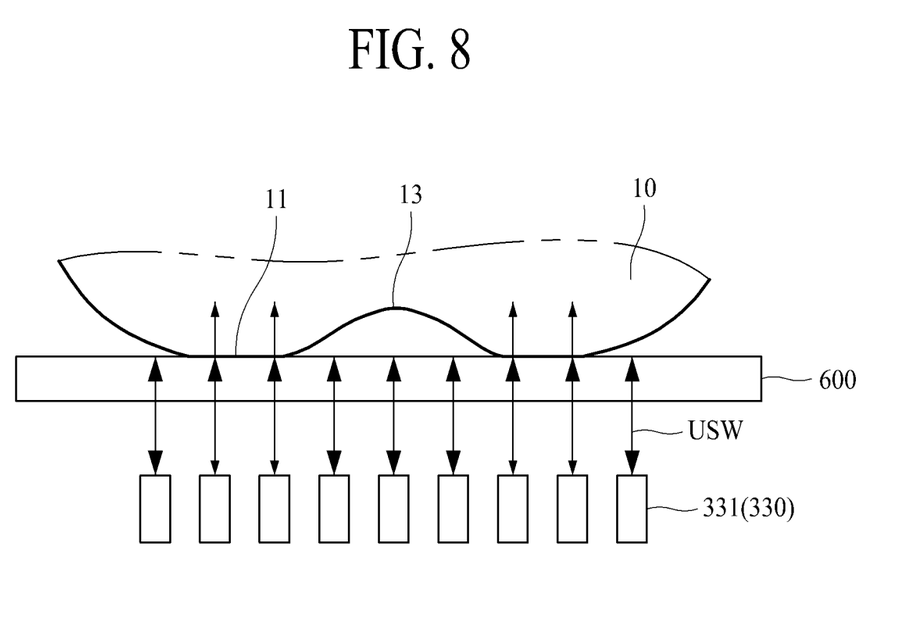
FIG. 8 is a diagram illustrating an operation of a fingerprint sensor illustrated in FIG. 7.

FIG. 7 is a diagram illustrating an output of a sound and sensing of biometric information in an electronic apparatus according to an example embodiment of the present disclosure. FIG. 8 is a diagram illustrating an operation of a fingerprint sensor illustrated in FIG. 7.

With reference to FIGS. 7 and 8, the electronic apparatus according to an example embodiment of the present disclosure may be configured to vibrate a piezoelectric panel 310 of a piezoelectric panel speaker module 300 and may output a sound SW, generated by a display panel 110 which vibrates based on the vibration of the piezoelectric panel 310, to a region in front of the display panel 110. For example, when a vibration driving signal is applied to first and second electrodes of the piezoelectric panel 310, a piezoelectric film may be deformed (or vibrate) due to an inverse piezoelectric effect of the piezoelectric film based on the vibration driving signal. The display panel 110 may vibrate according to the vibration of the piezoelectric panel 310 based on the deformation of the piezoelectric film, whereby the sound SW may be output according to the vibration of the display panel 110.

Moreover, the electronic apparatus according to an example embodiment of the present disclosure may transmit or receive an ultrasound signal USW through each of a plurality of fingerprint sensors 330 embedded into the piezoelectric panel 310 of the piezoelectric panel speaker module 300 to sense biometric information about a finger 10 of a user.

For example, when a biometric recognition object, such as a finger 10 of the user, contacts a cover window 600 on the fingerprint sensor 330, the fingerprint sensor 330 may output, through each of a plurality of piezoelectric elements 331, the ultrasound signal USW to the biometric recognition object according to a biometric recognition driving signal.

Of the ultrasound signals USW output from the plurality of piezoelectric elements 331, an ultrasound signal USW traveling to a valley pattern 13 of a fingerprint may be reflected back to the piezoelectric element 331 without passing through a boundary surface between the piezoelectric element 331 and an air layer, due to a sound impedance difference between the piezoelectric element 331 and the air layer. On the other hand, an ultrasound signal USW traveling to a ridge pattern 11 of the fingerprint may pass through the boundary surface between the piezoelectric element 331 and the air layer, and may travel into the user finger 10. Therefore, the most of an ultrasound signal USW output from a piezoelectric element 331 overlapping the valley pattern 13 of the fingerprint may be reflected back to the piezoelectric element 331, whereas the most of an ultrasound signal USW output from a piezoelectric element 331 overlapping the ridge pattern 11 of the fingerprint may not be reflected back to the piezoelectric element 331. Therefore, the fingerprint sensor 330 may generate an electronic apparatus-based ultrasound received signal according to a piezoelectric effect of each of the piezoelectric elements 331 based on the ultrasound signal USW respectively received by each of the plurality of piezoelectric elements 331 and may provide the ultrasound received signal to a driving circuit unit.

The driving circuit unit according to an example embodiment may identify a fingerprint pattern (or biometric information) of the user finger 10, based on an intensity of a piezoelectric element-based ultrasound received signal output from the fingerprint sensor 330.

According to another example embodiment of the present disclosure, the driving circuit unit may additionally identify biometric information, such as an internal bone form or blood vessel form of the user finger 10, based on an intensity of an ultrasound received signal corresponding to piezoelectric elements 331 overlapping the ridge pattern 11 of the fingerprint. For example, an ultrasound signal USW output from the piezoelectric element 331 overlapping the ridge pattern 11 of the fingerprint may be reflected by an internal bone or blood vessel of the user finger 10, and may be transferred back to the piezoelectric element 331. Thus, the driving circuit unit may identify the internal bone form or blood vessel form of the user finger 10, based on the ultrasound signal received by the piezoelectric element 331 overlapping the ridge pattern 11 of the fingerprint. Accordingly, in an example embodiment of the present disclosure, the driving circuit unit may identify biometric information including, but not limited to, a bone form, a blood vessel form, and/or a fingerprint pattern by using the fingerprint sensor 330 to determine whether the biometric information, e.g., fingerprint, is forged or not, thereby enhancing security of electronic apparatuses.

As described above, in the electronic apparatus according to an example embodiment of the present disclosure, the display panel may vibrate by using the piezoelectric panel 310 of the piezoelectric panel speaker module 300 to output a sound SW. In addition, biometric information about the user 10 may be sensed by transmitting or receiving an ultrasound signal SW through the fingerprint sensors 330 of the piezoelectric panel speaker module 300. Also, in an example embodiment of the present disclosure, each of the plurality of fingerprint sensors 330 may be embedded into or provided as one body with the piezoelectric panel 310 of the piezoelectric panel speaker module 300, thereby enabling slimming of electronic apparatuses and reducing the manufacturing cost. Further, biometric information about a user finger may be recognized in an entire screen region, or in one or more specific regions of the electronic apparatus.

Figure 9:
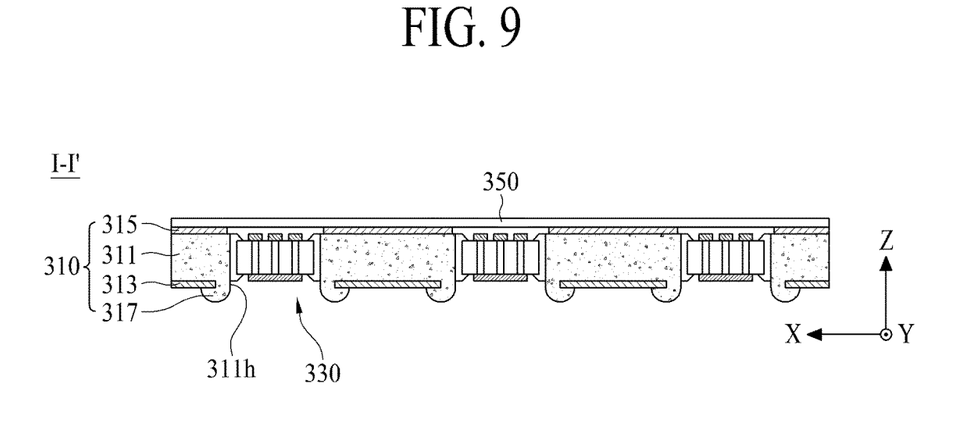
FIGS. 9 to 11 are cross-sectional views illustrating a piezoelectric panel speaker module according to additional example embodiments of the present disclosure.
Figure 10:
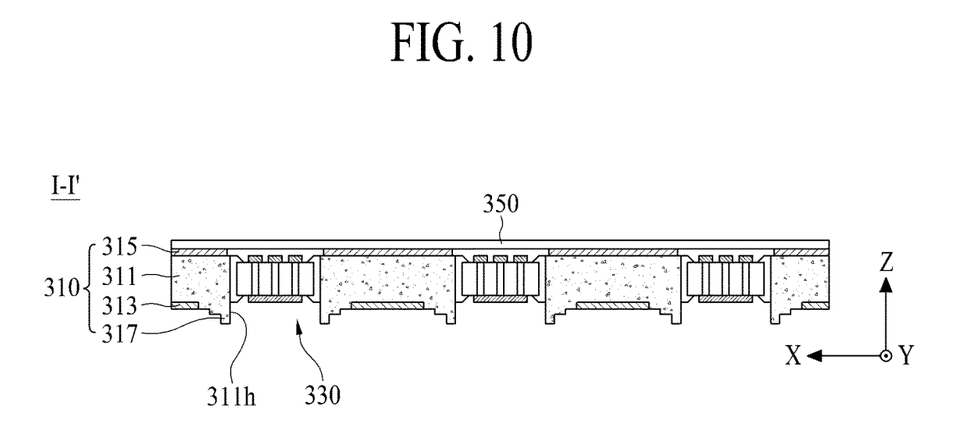
Figure 11:
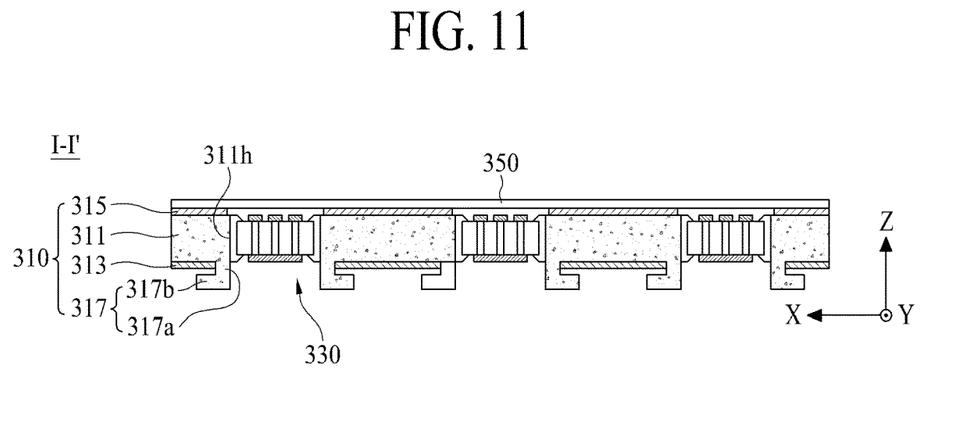
Figure 12:
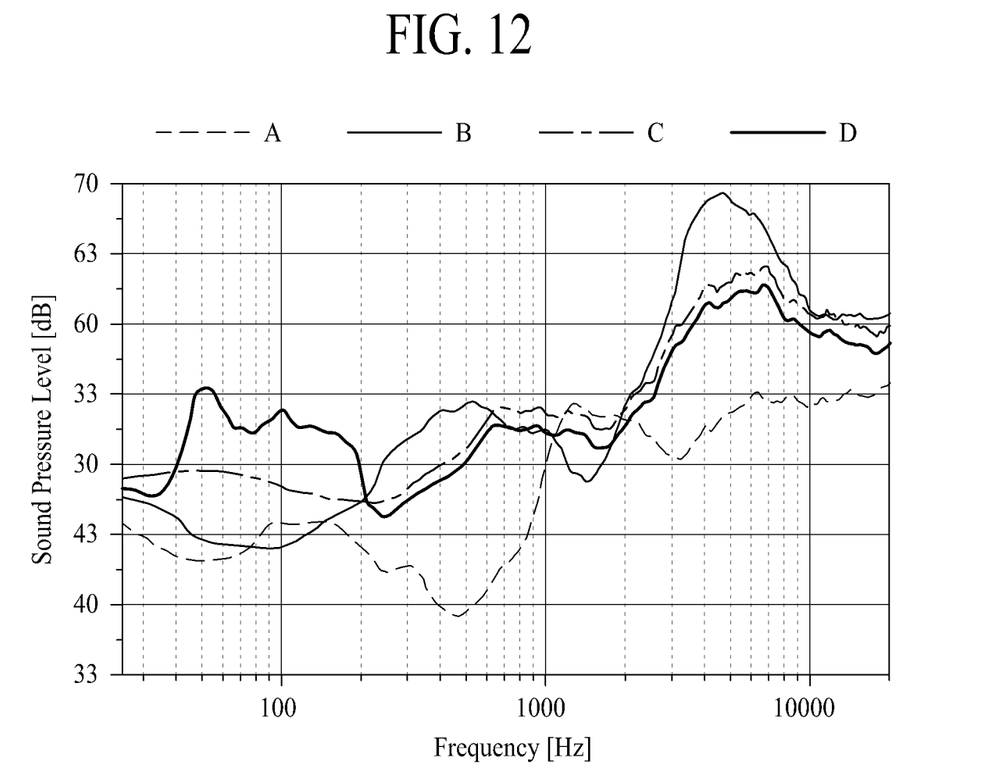
FIG. 12 is a graph showing a sound pressure characteristic with respect to a frequency of the example piezoelectric panel speaker modules illustrated in FIGS. 4 and 9 to 11.

FIGS. 9 to 11 are diagrams illustrating a piezoelectric panel speaker module 300 according to additional example embodiments of the present disclosure, and are cross-sectional views taken along line I-I' illustrated in FIG. 2 for the respective additional example embodiments. FIG. 12 is a graph showing a sound pressure characteristic with respect to a frequency of the example piezoelectric panel speaker modules illustrated in FIG. 4 and FIGS. 9 to 11.

With reference to FIGS. 9 and 12, the piezoelectric panel speaker module 300 according to additional example embodiments of the present disclosure may include a piezoelectric panel 310, including a plurality of holes 311h and a plurality of fingerprint sensors 330 respectively accommodated into the plurality of holes 311h provided in the piezoelectric panel 310. The piezoelectric panel speaker module 300 according to additional example embodiments of the present disclosure may be implemented by modifying an example structure of the piezoelectric panel 310 of the piezoelectric panel speaker module 300 illustrated in FIGS. 2 to 5. Therefore, in the description below, the piezoelectric panel 310 and only details relevant thereto will be discussed, and the above descriptions of the other elements are not repeated.

The piezoelectric panel 310 according to an example embodiment of the present disclosure may include a piezoelectric film 311 including the plurality of holes 311h, a first electrode 313 on a first surface of the piezoelectric film 311, a second electrode 315 on a second surface of the piezoelectric film 311, and a plurality of protrusions 317 protruding or extending out of the first surface of the piezoelectric film 310 to surround each of the plurality of holes 311h. In the piezoelectric panel 310 having such a configuration, the other elements of the piezoelectric panel 310 except for the plurality of protrusions 317 are the same as those in the piezoelectric panel speaker module 300 illustrated in FIGS. 2 to 5. Thus, the above descriptions of the same elements are not repeated.

Each of the plurality of protrusions 317 may protrude from the first surface of the piezoelectric film 310 in a curved cross-sectional structure to surround a corresponding hole of the plurality of holes 311h. For example, each of the plurality of protrusions 317 according to an example embodiment of the present disclosure may include a semicircular cross-sectional surface and may include an opening overlapping a corresponding one of the plurality of holes 311h, as illustrated in FIG. 9. Each of the plurality of protrusions 317 may be formed by a process where a partial region (i.e., a hole forming region) of the piezoelectric film 311, where a corresponding hole of the plurality of holes 311h is to be formed, protrudes out of the first surface of the piezoelectric film 311. Also, the piezoelectric film 311 may be formed of a piezoelectric material which may be melted at a high temperature. Thus, a piezoelectric material of the hole forming region may protrude out of the first surface of the piezoelectric film 311 when each of the plurality of holes 311h is formed, thereby forming the protrusions 317.

For example, each of the plurality of protrusions 317 may be formed by a process where the piezoelectric material of the hole forming region protrudes out of the first surface of the piezoelectric film 311 by pressurizing the hole forming region of the piezoelectric film 311 with a hole processing apparatus which has been heated to a high temperature. At this time, the piezoelectric material protruding out of the first surface of the piezoelectric film 311 may be naturally cured to have a curved shape. Alternatively, the piezoelectric material protruding out of the first surface of the piezoelectric film 311 may be filled into a curved concave portion provided in a mask jig, and thus may have a curved shape.

As another example, each of the plurality of protrusions 317 may be formed by a process where each of the plurality of fingerprint sensors 330 including a ceramic piezoelectric material resistant to heat is heated at a high temperature. By pressuring the hole forming region of the piezoelectric film 311 with each of the plurality of fingerprint sensors 330 heated at a high temperature, the piezoelectric material of the hole forming region may protrude out of the first surface of the piezoelectric film 311. At this time, the piezoelectric material protruding out of the first surface of the piezoelec- tric film 311 may be naturally cured to have a curved shape. Alternatively, the piezoelectric material protruding out of the first surface of the piezoelectric film 311 may be filled into a curved concave portion provided in a mask jig and thus may have a curved shape.

As described above, in the piezoelectric panel speaker module 300 according to an example embodiment of the present disclosure, a surface area may be enlarged by each of the plurality of protrusions 317 in the piezoelectric panel 310 to have a curved cross-sectional structure. Thus, a sound pressure may increase. For example, as shown in FIG. 12, in a sound pressure characteristic B of the piezoelectric panel speaker module 300 according to an example embodiment of the present disclosure illustrated in FIG. 9, a sound band frequency characteristic in a range of 0 Hz to 80 Hz and a range of 150 Hz to 1,000 Hz increases in comparison with a sound pressure characteristic A of the example piezoelec- tric panel speaker module illustrated in FIG. 4.

With reference to FIGS. 10 and 12, in the piezoelectric panel speaker module 300 according to an example embodi- ment of the present disclosure, each of the plurality of protrusions 317 in the piezoelectric panel 310 may have a multi-step structure where a width of the protrusion becomes smaller as they extend farther away from the first surface of the piezoelectric film 310. The protrusions 317 may each surround a corresponding one of the plurality of holes 311h. Each of the protrusions 317 according to an example embodiment of the present disclosure may include a stepped cross-sectional surface including a plurality of stepped por- tions. Each of the plurality of protrusions 317 may include an opening overlapping a corresponding one of the plurality of holes 311h. Except for a cross-sectional structure, the plurality of protrusions 317 may be formed in the same process as the protrusions illustrated in FIG. 9. Thus, the above description of the process is not repeated.

As described above, in the piezoelectric panel speaker module 300 according to an example embodiment of the present disclosure, a surface area may be enlarged by each of the plurality of protrusions 317 which is provided in the piezoelectric panel 310 to have a stepped cross-sectional structure including a plurality of stepped portions. Thus, the overall sound pressure may increase more. Therefore, as illustrated in FIG. 12, in a sound pressure characteristic C of the piezoelectric panel speaker module 300 according to an example embodiment of the present disclosure illustrated in FIG. 10, a sound band frequency characteristic in a range of 0 Hz to 1,000 Hz increases in comparison with the sound pressure characteristic A of the example piezoelectric panel speaker module illustrated in FIG. 4. Particularly, a low-pitched sound band frequency characteristic in a range of 0 Hz to 80 Hz increases.

With reference to FIGS. 11 and 12, in the piezoelectric panel speaker module 300 according to an example embodi- ment of the present disclosure, each of the plurality of protrusions 317 in the piezoelectric panel 310 may include a vertical portion 317a, which protrudes or extends out of the first surface of the piezoelectric film 311 to surround a corresponding one of the plurality of holes 311h, and a horizontal portion 317b which is bent from the vertical portion 317a away from the corresponding hole so to be substantially parallel to the first surface of the piezoelectric film 311. For example, each of the plurality of protrusions 317 according to an example embodiment of the present disclosure may have a "⌐ ¬"-shaped (or an inverse "L" and "L" shaped) cross-sectional structure surrounding a corresponding one of the plurality of holes 311h. The horizontal portion 317b of each of the plurality of protru- sions 317 may be provided substantially parallel to the first surface of the piezoelectric film 311 with a gap region therebetween. Thus, the horizontal portion 317b may be a reflective plate which reflects a sound pressure. Except for a cross-sectional structure, the plurality of protrusions 317 may be formed in the same process as the protrusions illustrated in FIG. 9. Thus, the above description of the process is not repeated.

As described above, in the piezoelectric panel speaker module 300 according to an example embodiment of the present disclosure, a surface area may be enlarged by each of the plurality of protrusions 317 in the piezoelectric panel 310 to have the function of the reflective plate. Thus, the overall sound pressure may increase more. Therefore, as illustrated in FIG. 12, in a sound pressure characteristic D of the piezoelectric panel speaker module 300 according to an example embodiment of the present disclosure illustrated in FIG. 11, a sound band frequency characteristic in a range of 0 Hz to 1,000 Hz increases in comparison with the sound pressure characteristic A of the example piezoelectric panel speaker module illustrated in FIG. 4. Particularly, a sound having resonance and a phase difference based on each of the plurality of protrusions 317 may be added to a sound which is output to a region in front of the display panel, whereby a low sound band frequency characteristic in a range of 0 Hz to 200 Hz increases significantly.

Therefore, in the piezoelectric panel speaker module 300 according to an example embodiment of the present disclo- sure, a surface area of the piezoelectric panel 310 maybe enlarged by each of the plurality of protrusions 317 provided in the piezoelectric panel 310 such that the overall sound pressure may increase. Particularly, a low-pitched sound band frequency characteristic may increase.

The electronic apparatus according to example embodi- ments of the present disclosure may be, without limitation, a wall paper television (TV), a monitor, a notebook computer, a smartphone, a tablet computer, an electronic pad, a wearable device, a foldable device, a rollable device, a bendable device, a flexible device, a curved device, a watch phone, a portable information device, a navigation device, a vehicle control display device, or the like.

A piezoelectric panel speaker according to an embodiment of the present disclosure may include: a piezoelectric panel including a plurality of holes; and a plurality of fingerprint sensors respectively accommodated into the plurality of holes.

According to some embodiments of the present disclosure, the piezoelectric panel may include: a piezoelectric film including the plurality of holes; a first electrode in a portion, except for the plurality of holes, of a first surface of the piezoelectric film; and a second electrode in a portion, except for the plurality of holes, of a second surface opposite to the first surface of the piezoelectric film.

According to some embodiments of the present disclosure, the piezoelectric film may include one or more of: a polymer material-containing piezoelectric material, a thin film material-containing piezoelectric material, and a composite material-containing piezoelectric material.

According to some embodiments of the present disclosure, the polymer material-containing piezoelectric material may include poly vinylidene fluoride (PVDF), polyvinylidene fluoride trifluoroethylene P(VDF-TrFe), or P(VDFTeFE), the thin film material-containing piezoelectric material may include ZnO, CdS, or AlN, and the composite material-containing piezoelectric material may include PZT-PVDF, PZT-silicon rubber, PZT-epoxy, PZT-foam polymer, or PZT-foam urethane.

According to some embodiments of the present disclosure, each of the plurality of fingerprint sensors may include a plurality of piezoelectric elements.

According to some embodiments of the present disclosure, each of the plurality of piezoelectric elements may include a single crystalline ceramic piezoelectric material or a polycrystalline ceramic piezoelectric material.

According to some embodiments of the present disclosure, the single crystalline ceramic piezoelectric material may include α-AlPO$_4$, α-SiO$_2$, LiNbO$_3$, Tb$_2$(MoO$_4$)$_3$, Li$_2$B$_4$O$_7$, or ZnO, and the polycrystalline ceramic piezoelectric material may include a PZT-based ceramic piezoelectric material, a PT-based ceramic piezoelectric material, a PZT-complex perovskite-based ceramic piezoelectric material, or BaTiO$_3$.

According to some embodiments of the present disclosure, each of the plurality of fingerprint sensors may further include: a first sensor electrode electrically connected to one end of each of the plurality of piezoelectric elements; and a plurality of second sensor electrodes electrically connected to another end of each of the plurality of piezoelectric elements.

According to some embodiments of the present disclosure, a total surface area of the plurality of holes may be 5% to 20% of a total surface area of the piezoelectric panel.

According to some embodiments of the present disclosure, an area of each of the plurality of holes may be 1 cm$^2$ to 4 cm$^2$, and a distance between the plurality of holes is 3 cm or more.

According to some embodiments of the present disclosure, the piezoelectric panel may further include a plurality of protrusions extended toward the first surface of the piezoelectric film to surround each of the plurality of holes.

According to some embodiments of the present disclosure, each of the plurality of protrusions may have a curved cross-sectional structure, or may have a multi-layer structure having a smaller area as farther away from the first surface of the piezoelectric film.

According to some embodiments of the present disclosure, each of the plurality of protrusions may include: a vertical portion extended toward the first surface of the piezoelectric film; and a horizontal portion bent from the vertical portion in parallel to the first surface of the piezoelectric film.

According to some embodiments of the present disclosure, each of the plurality of fingerprint sensors may transmit or receive an ultrasound signal.

An electronic apparatus according to an embodiment of the present disclosure includes: a display module configured to display an image; and a piezoelectric panel speaker module behind the display module, wherein the piezoelectric panel speaker module is configured to vibrate the display module to output a sound and may transmit or receive a biometric recognition signal.

According to some embodiments of the present disclosure, the piezoelectric panel speaker module may include: a piezoelectric panel including at least one hole; and at least one fingerprint sensor accommodated into the at least one hole.

According to some embodiments of the present disclosure, the at least one fingerprint sensor may include a plurality of piezoelectric elements transmitting or receiving the biometric recognition signal.

According to some embodiments of the present disclosure, the at least one fingerprint sensor may further include: a first sensor electrode connected to a first surface of each of the plurality of piezoelectric elements; and a plurality of second sensor electrodes connected to a second surface of each of the plurality of piezoelectric elements.

According to some embodiments of the present disclosure, the display module may include an organic light emitting display panel, and the piezoelectric panel speaker module may be attached to a rear surface of the organic light emitting display panel.

According to some embodiments of the present disclosure, the piezoelectric panel speaker module may include the piezoelectric panel speaker.

According to some embodiments of the present disclosure, the biometric recognition signal may be an ultrasound signal which is transmitted or received by each of the plurality of fingerprint sensors in the piezoelectric panel speaker.

According to some embodiments of the present disclosure, the display module may include an organic light emitting display panel, and the piezoelectric panel speaker module may be attached to a rear surface of the organic light emitting display panel.

The piezoelectric panel speaker according to an embodiment of the present disclosure may vibrate the display panel to output a sound and may recognize biometric information.

The electronic apparatus according to an embodiment of the present disclosure may vibrate the display panel by using the piezoelectric panel speaker module to output a sound, and may output an accurate sound, thereby enhancing the immersion experience of a viewer. Also, even without a separate bio-information recognition device, biometric information may be recognized by transmitting or receiving an ultrasound signal through the piezoelectric panel speaker module. By recognizing ultrasound biometric information, security may be enhanced.

It will be apparent to those skilled in the art that various modifications and variations may be made in the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. An electronic apparatus, comprising:
a display module configured to display an image; and
a piezoelectric panel speaker module behind the display module,
wherein the piezoelectric panel speaker module is configured to vibrate the display module to output sound, and to transmit or receive a biometric recognition signal, and
wherein the piezoelectric panel speaker module includes a piezoelectric film including at least one hole and a plurality of piezoelectric elements accommodated into the at least one hole of the piezoelectric film, and
wherein the at least one hole passes through the piezoelectric film.

2. The electronic apparatus of claim 1, wherein the piezoelectric panel speaker module comprises:
a piezoelectric panel including the piezoelectric film; and
a fingerprint sensor accommodated into the at least one hole.

3. The electronic apparatus of claim 2, wherein the fingerprint sensor comprises the plurality of piezoelectric elements configured to transmit or receive the biometric recognition signal, or both.

4. The electronic apparatus of claim 2, wherein the fingerprint sensor comprises:
a first sensor electrode connected to a first surface of each of the plurality of piezoelectric elements; and
a plurality of second sensor electrodes, each connected to a second surface of a corresponding one of the plurality of piezoelectric elements.

5. The electronic apparatus of claim 2, wherein:
the piezoelectric panel-comprises a plurality of holes including the at least one hole, and
an area of each of the holes is 1 cm$^2$ to 4 cm$^2$, and a distance between two adjacent holes among the holes is 3 cm or more.

6. The electronic apparatus of claim 2, wherein the at least one hole occupies 5% to 20% of a total area of a surface of the piezoelectric panel.

7. The electronic apparatus of claim 1, wherein:
the display module comprises a light emitting display panel, and
the piezoelectric panel speaker module is attached to a rear surface of the light emitting display panel.

8. The electronic apparatus of claim 1, wherein the biometric recognition signal is an ultrasound signal.

9. The electronic apparatus of claim 1, wherein the piezoelectric panel speaker module further comprises:
a first electrode on a first surface of the piezoelectric film, except in a portion where the at least one hole is located; and
a second electrode on a second surface of the piezoelectric film opposite the first surface, except in a portion where the at least one hole is located, the piezoelectric film being between the first electrode and the second electrode.

10. The electronic apparatus of claim 9, wherein the piezoelectric panel speaker module further comprises a protrusion protruding from the first surface of the piezoelectric film to surround each of the at least one hole.

11. The electronic apparatus of claim 10, wherein the protrusion includes:
a curved cross-sectional structure,
a multi-step structure having a smaller width farther away from the first surface of the piezoelectric film than closer to the first surface, or
an L-shaped cross-sectional structure having a vertical portion extending out of the first surface of the piezoelectric film, and a horizontal portion bent from the vertical portion and substantially parallel to the first surface of the piezoelectric film.

12. The electronic apparatus of claim 1, wherein the piezoelectric film comprises one or more of a polymer material-having piezoelectric material, a thin film material-having piezoelectric material, and a composite material-having piezoelectric material.

13. The electronic apparatus of claim 12, wherein:
the polymer material-having piezoelectric material comprises poly vinylidene fluoride (PVDF), polyvinylidene fluoride trifluoroethylene P(VDF-TrFe), or P(VDFTeFE),
the thin film material-having piezoelectric material comprises ZnO, CdS, or AlN, and
the composite material-having piezoelectric material comprises PZT-PVDF, PZT-silicon rubber, PZT-epoxy, PZT-foam polymer, or PZT-foam urethane.

14. The electronic apparatus of claim 1, wherein each of the piezoelectric elements comprises a single crystalline ceramic piezoelectric material or a polycrystalline ceramic piezoelectric material.

15. The electronic apparatus of claim 14, wherein:
the single crystalline ceramic piezoelectric material comprises α-AlPO$_4$, α-SiO$_2$, LiNbO$_3$, Tb$_2$(MoO$_4$)$_3$, Li$_2$B$_4$O$_7$, or ZnO, and
the polycrystalline ceramic piezoelectric material comprises a PZT-based ceramic piezoelectric material, a PT-based ceramic piezoelectric material, a PZT-complex perovskite-based ceramic piezoelectric material, or BaTiO$_3$.

16. An electronic apparatus, comprising:
a display module configured to display an image; and
a piezoelectric panel speaker module behind the display module,
wherein the piezoelectric panel speaker module is configured to vibrate the display module to output sound, and to transmit or receive a biometric recognition signal,
wherein the piezoelectric panel speaker module includes a piezoelectric film including at least one hole and a fingerprint sensor accommodated into the at least one hole, and
wherein the at least one hole passes through the piezoelectric film.

17. The electronic apparatus of claim 16, wherein the fingerprint sensor is configured to sense biometric information.

18. The electronic apparatus of claim 17, wherein the fingerprint sensor comprises a plurality of piezoelectric elements configured to transmit or receive the biometric recognition signal, or both.

19. The electronic apparatus of claim 18, wherein the fingerprint sensor comprises:
a first sensor electrode connected to a first surface of each of the plurality of piezoelectric elements; and
a plurality of second sensor electrodes, each connected to a second surface of a corresponding one of the plurality of piezoelectric elements.

20. The electronic apparatus of claim 16, wherein:
the display module comprises a light emitting display panel, and
the piezoelectric panel speaker module is attached to a rear surface of the light emitting display panel.

21. The electronic apparatus of claim 16, wherein the biometric recognition signal is an ultrasound signal.

22. The electronic apparatus of claim 16, wherein the piezoelectric panel speaker module further comprises:
a first electrode on a first surface of the piezoelectric film, except in a portion where the at least one hole is located; and
a second electrode on a second surface of the piezoelectric film opposite the first surface, except in a portion where the at least one hole is located, the piezoelectric film being between the first electrode and the second electrode.

23. The electronic apparatus of claim 22, wherein the piezoelectric panel speaker module further comprises a protrusion protruding from the first surface of the piezoelectric film to surround each of the at least one hole.

24. The electronic apparatus of claim 23, wherein the protrusion includes:
a curved cross-sectional structure,
a multi-step structure having a smaller width farther away from the first surface of the piezoelectric film than closer to the first surface, or
an L-shaped cross-sectional structure having a vertical portion extending out of the first surface of the piezoelectric film, and a horizontal portion bent from the vertical portion and substantially parallel to the first surface of the piezoelectric film.

\* \* \* \* \*